United States Patent [19]
Hoffmann et al.

[11] 3,979,139
[45] Sept. 7, 1976

[54] SAFETY DEVICE HAVING A CONTOURED ENERGY ABSORBING IMPACT ELEMENT

[75] Inventors: Günter Hoffmann, Gifhorn; Wilfried Köpke, Sulfeld; Rüdiger Weissner, Fallersleben, all of Germany

[73] Assignee: Volkswagenwerk Aktiengesellschaft, Wolfsburg, Germany

[22] Filed: Jan. 31, 1975

[21] Appl. No.: 545,967

[30] Foreign Application Priority Data
Feb. 15, 1974  Germany............................ 2407178

[52] U.S. Cl.................................. 280/751; 297/390
[51] Int. Cl.²......................................... B60R 21/02
[58] Field of Search.... 280/150 B, 150 SB, 150 AB, 280/747, 748, 750, 751, 752, 729; 180/90; 297/390

[56] References Cited
UNITED STATES PATENTS

| | | | |
|---|---|---|---|
| 3,630,472 | 12/1971 | Axenborg.................... | 280/150 B X |
| 3,819,204 | 6/1974 | Oka................................. | 180/90 X |
| 3,888,506 | 6/1975 | Haas.............................. | 180/90 X |
| 3,897,848 | 9/1975 | Arnstson et al....................... | 180/90 |

FOREIGN PATENTS OR APPLICATIONS

| | | | |
|---|---|---|---|
| 2,338,026 | 7/1973 | Germany............................ | 28/150 B |

*Primary Examiner*—Robert R. Song
*Assistant Examiner*—Michael J. Forman
*Attorney, Agent, or Firm*—Brumbaugh, Graves, Donohue & Raymond

[57] ABSTRACT

A safety device for a passenger in a vehicle, such as an automobile, comprises an energy absorbing impact element mounted on the vehicle adjacent the knees of a passenger seated in an associated vehicle seat. A surface of the impact element is presented to the passenger's knees and is configured to guide his knees, when impacting on the element, into positions in which the passenger's thighs are aligned generally parallel to the longitudinal axis of the vehicle. The guiding action of the impact element is preferably accomplished by providing at least one recess in the element to receive the passenger's knees. The safety device may also comprise a shoulder safety belt extending diagonally across the upper portion of the passenger's body to restrain the passenger against the vehicle seat. A guide member may be mounted on an adjacent door of the vehicle so as to guide the passenger's knees toward the recess in the impact element.

12 Claims, 5 Drawing Figures

SAFETY DEVICE HAVING A CONTOURED ENERGY ABSORBING IMPACT ELEMENT

BACKGROUND OF THE INVENTION

To protect passengers in a vehicle, such as an automobile, against injury in the event of a collision, the potentially injurious effects of the high deceleration forces acting on the vehicle, as a result of the collision, must be moderated. One commonly practiced method of moderating the effects is to hold the vehicle passengers securely against portions of the vehicle, such as it seats. The passengers thus decelerate at essentially the same instant and at the same rate as the vehicle and are not "thrown", as a result of differing times or rates of deceleration, against parts of the vehicle interior.

The most widely used device for securely holding a passenger in an automobile is a safety belt that straps the passenger firmly to his seat. A safety belt may include a single belt or strap arranged to extend across a passenger's lap or diagonally across his body from one shoulder to the opposite hip. Another type of safety belt, designated a three-point safety belt, includes two belts or straps which are joined together so that only three connections are necessary to secure the ends of the belts to the automobile. Generally, a three-point safety belt is a combination lap belt and diagonal shoulder belt.

A commonly owned, copending patent application, Ser. No. 401,680, filed Sept. 28, 1973, now U.S. Pat. No. 3,931,988, patented Jan. 13, 1976, describes and illustrates a safety device for vehicle passengers which includes a restraint, such as a shoulder belt, for the upper portion of a passenger's body and an energy absorbing impact element disposed on the vehicle adjacent the passenger's knees. The shoulder belt, or a functionally similar device, affords protective restraint for the upper portion of the passenger's body, while the lower portion of his body is protected by the impact element. The inventive safety device of application Ser. No. 401,680 is particularly suited for use as a passive safety device in which one end of the shoulder belt is located on a door adjacent the vehicle seat associated with the device. Such a passive safety device does not require the user to handle the safety belt upon entering or leaving the vehicle.

The illustrated embodiment of the impact element of application Ser. No. 401,680 is fabricated of two lengths of sheet metal formed with M-shaped cross sections. A similar impact element having a different, generally U-shaped cross section is described and illustrated in commonly-owned, copending patent application Ser. No. 486,864, filed July 9, 1974.

In addition to the impact elements for a passenger's knees described and illustrated in the patent applications identified above, various energy absorbing impact elements for the upper portion of a passenger's body have been proposed. Examples of such impact elements are described and illustrated in the following United States patents: Smith U.S. Pat. No. 3,468,556, Akiyama U.S. Pat. No. 3,806,154, Stegmaier U.S. Pat. No. 3,774,713, Glance U.S. Pat. No. 3,831,705, Wilfert U.S. Pat. No. 3,817,553 and Sobkow U.S. Pat. No. 3,614,128.

SUMMARY OF THE INVENTION

The present invention is directed to an energy absorbing impact element for protecting a passenger in a vehicle, such as an automobile, which can be utilized in a safety device such as described and illustrated in copending application Ser. No. 401,680, filed Sept. 28, 1973. The impact element of the present invention may also be used in conjunction with conventional air bag safety devices. An impact element, according to the invention, comprises a plastically deformable member mounted on a vehicle in a zone adjacent the knees of a passenger seated in an associated vehicle seat. A surface of the impact element presented to the passenger's knees is configured to guide the passenger's knees, when impacting on the element, into positions in which the passenger's thighs are aligned generally parallel to the longitudinal axis of the vehicle. By insuring that the passenger's thighs are so aligned, the impact element will be safer and more effective in its operation and, in particular, avoid injuries to the passenger's hip joints.

In a preferred embodiment of the invention, the impact element is used in conjunction with a shoulder safety belt extending diagonally across the upper portion of a passenger's body to restrain his body against the vehicle seat. The surface of the impact element presented to the passenger is configured to define at least one recess adapted to receive the passenger's knees, the recess widening in a direction toward the passenger seated in the associated seat. Although a single recess can be used to accommodate both of the passenger's knees, it is desirable to have a separate recess for each knee.

A safety device or system that includes a shoulder belt and an impact element according to the invention may also include a guide member mounted on a door of the vehicle adjacent the vehicle seat. When the vehicle door is closed and a passenger is seated in the vehicle seat, the guide member lies adjacent one of the passenger's thighs. The guide member is configured and located so that it has a surface defining an extension of and aligned with a portion of the surface of the impact element presented to the passenger. The portion of the surface of the impact element is one of the inclined side boundaries of the recess in the element, so that the guide member guides the passenger's knees toward the recess in the impact element.

The impact element of the present invention can have any cross sectional configuration, although the configuration described and illustrated in copending application Ser. No. 486,864, filed July 9, 1974, is considered most desirable. The impact element should be constructed to provide favorable deformation behavior. Specifically, the plastically deformable member should be constructed such that the derivative trend of force with respect to time during deformation of the member remains relatively constant and does not include any dangerous peaks. Thus, the force required to deform the deformable member or, stated another way, the reaction force exerted by the member should remain essentially constant throughout the deformation of the member. If presented in graphic form, a plot of reaction force versus time should preferably approach a rectangular shape, with an initial relatively sharp rise, a relatively flat middle portion, and a terminal relatively sharp drop. With a relatively constant reaction force exerted by the deformable member, the impact element may be designed so that the deformation or reaction force approaches the limits of tolerance of a passenger impacting on the element and so that a relatively high energy absorption by the impact element is insured in the event of an accident.

In front impact tests of vehicles equipped with the knee-engaging impact element of the copending, commonly-owned applications noted above, very good deceleration and stress values were obtained, especially when the passenger assumed a sitting position with his thighs aligned generally in the direction of travel or parallel to the longitudinal axis of the vehicle. If, however, the passenger places his thighs at an angle to the direction of the travel at the instant of an accident or collision, whether his thighs are swung outwardly to the sides or inwardly toward a generally crossed position, the risk of injury becomes considerable, especially injuries to the pelvic region and the hip joints. For example, if the passenger's thighs are inclined too much towards each other, such as if his legs are crossed, the forces introduced from the thighs into the pelvic region may lead to dislocations, partial fractures of the ball sockets of the hip joints, strain fractures and similar injuries. Likewise, if the passenger's thighs are swung outwardly or spread too far apart, the lower portion of the passenger's body slides too far forward and the upper portion of his body, "submarines", i.e. slides below the diagonal shoulder belt, for example, and is no longer properly restrained by the shoulder belt.

In the preferred embodiment of the invention, in which the impact element extends transversely across the automobile, the trough-shaped or synclinical recesses in the impact element force the passenger's thighs to assume the most favorable position, in the event of an accident, while providing a given space for movement of the passenger's knees. Since the recesses widen in a direction toward the vehicle seat and the passenger, and since, under normal operating conditions, the passenger's knees are located at a distance from the impact surface of the impact element, the passenger normally has a comparatively large open space for moving his knees. When the impact element has a single recess for both of the passenger's knees, the passenger has greater freedom of movement than when a separate recess is provided for each of his knees.

BRIEF DESCRIPTION OF THE DRAWINGS

For a better understanding of the invention, reference may be made to the following description of several exemplary embodiments taken in conjunction with the figures of the accompanying drawings, in which.

DESCRIPTION OF EMBODIMENTS

Figure 1:
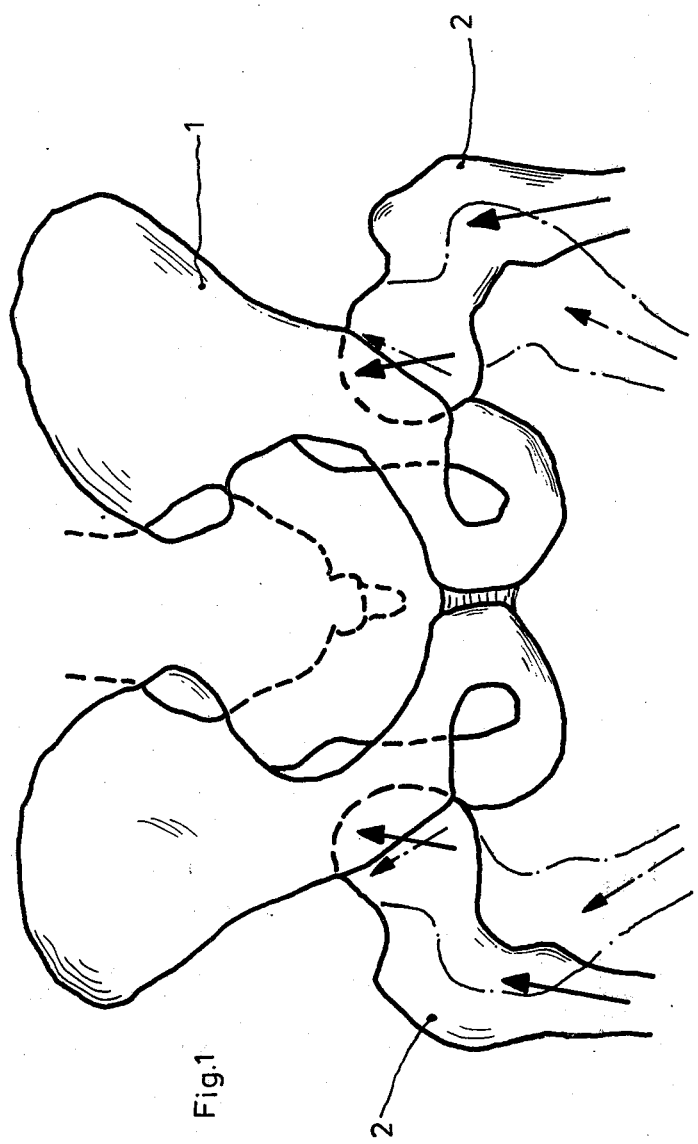
FIG. 1 is a diagrammatic view of a human pelvic region illustrating the transmission of an impact force through the femurs to the pelvis.

FIG. 1 of the drawings illustrates a human pelvic region including a pelvis 1 and pair of femurs 2. In the drawing, the positions of the femurs 2 shown in solid lines represent the most favorable positions in which forces exerted on a human thigh and femur can be safely transmitted to the pelvis. In contrast, the positions of the femurs 2 illustrated by the dot-dashed lines, representing an individual sitting with his knees close together, is a much less favorable position of the femurs for transmitting impact forces to the pelvis 1. As indicated by the dot-dashed arrows adjacent the hip joints shown in FIG. 1, the transmission of forces through the the femurs 2, when in the less favorable position, is such that the ball portions or capitulums of the femurs may be forced out of the comparatively shallow socket portions of the hip joints. In addition, other injuries, such as partial fractures of the sockets or strain fractures of the capitulums, may result from impact loads being transmitted through the femurs 2 when they are in the less favorable positions shown in the dot-dashed lines of FIG. 1.

The general conditions for favorable and unfavorable transmission of impact loads into the pelvic region of the human anatomy are particularly applicable to impact loads applied to the knees of a passenger sitting in an automobile seat in the event of a collision, or similar accident. Thus, if the passenger is sitting with his thighs aligned generally in the direction of travel, so that his legs are generally parallel, the impact forces generated when his knees strike an element in the front of the automobile can be transmitted to his pelvis in a reasonably safe manner. Similarly, if the passenger is sitting with his legs together, as exemplified by the dot-dashed lines in FIG. 1, or with his legs spread apart, the danger of injuries, as described above, is greatly increased.

Figure 2:
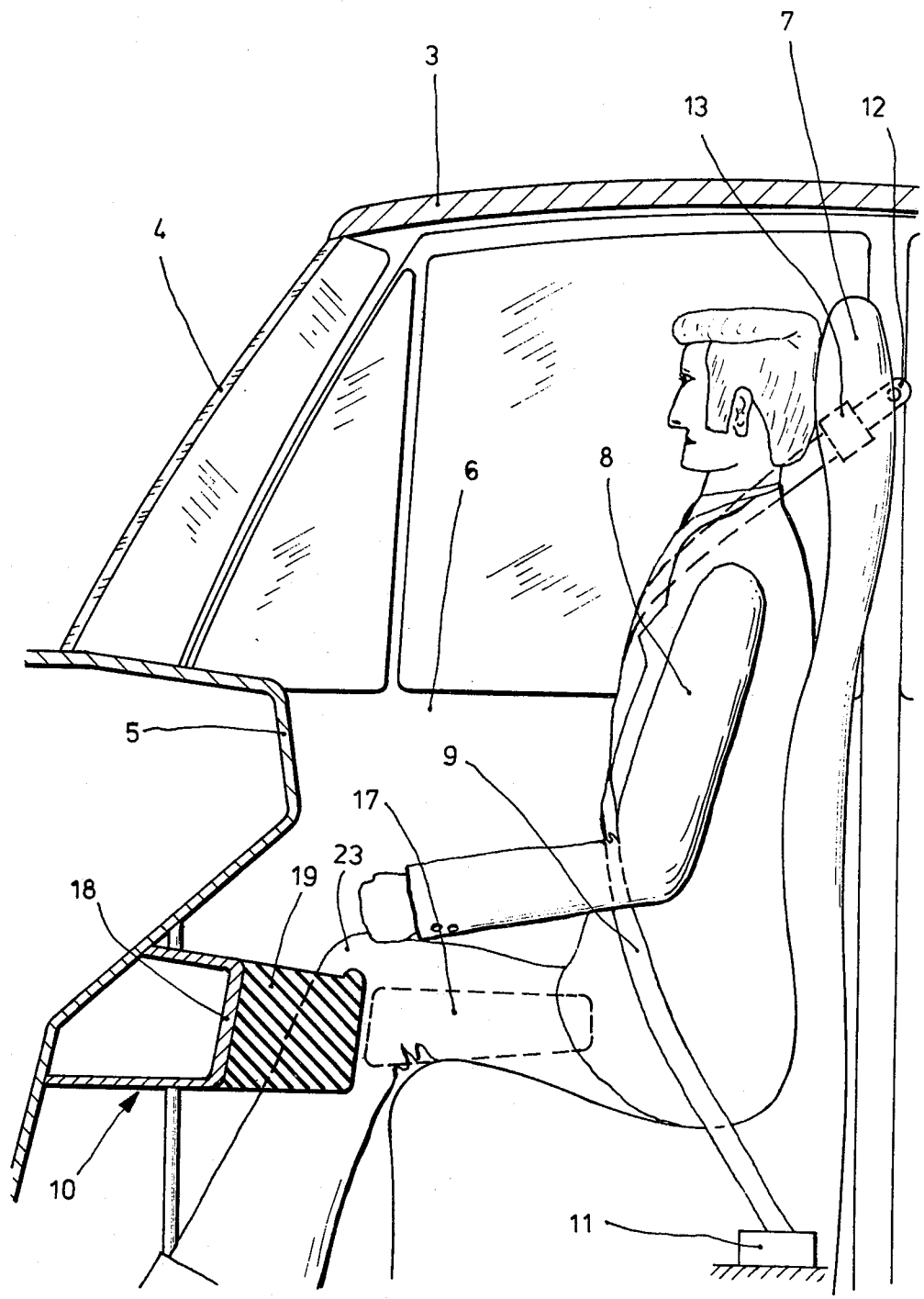
FIG. 2 is a partial side view of a passenger seated in an automobile equipped with an energy absorbing impact element according to the invention.
Figure 3:
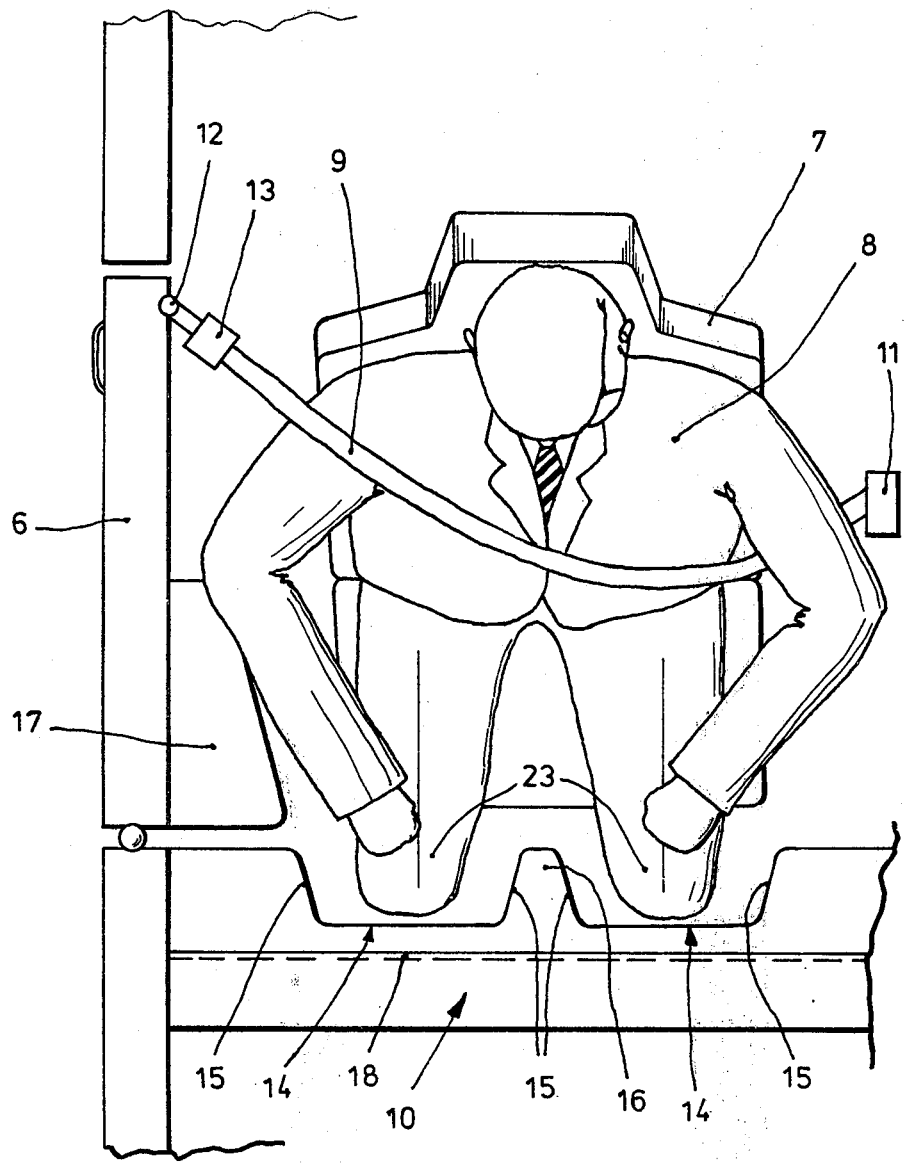
FIG. 3 is a plan view of the automobile illustrated in FIG. 2.

To insure that a passenger's thighs are properly aligned, in the event of an accident, in an automobile equipped with a safety system incorporating a knee-engaging impact element, the impact element is constructed, according to the present invention, as illustrated in FIGS. 2–5 of the drawings. In FIGS. 2 and 3, for example, a man, generally designated 8, is seated in the passenger's seat 7 of a passenger automobile. In front of the man 8, the frame of the automobile is configured to provide a dashboard 5. Immediately above the dashboard 5 is a windshield 4 that extends to the roof 3 of the automobile.

The man 8 is held in the seat 7 by a two-point safety belt 9. The safety belt 9 is a shoulder belt that is attached to the automobile on each side of the seat 7 and extends diagonally across the man 8 from his right shoulder to his left hip. The lower or left-hand end of the safety belt 9 is secured to the floor of the automobile, for example, to the tunnel or hump through which extends the drive shaft for the automobile. An automatic winding spool 11 is mounted on the floor to wind up automatically any excess length of the safety belt 9 which is not in use. The spool 11 may be of any conventional type that incorporates a locking mechanism to prevent the belt 9 from unwinding in the event of a collision.

The upper or right-hand end of the safety belt 9 is attached to the automobile adjacent the seat 7 by a bracket 12. The bracket 12 is preferably located on the upper rear portion of the door 6, as viewed from the side of the automobile. Mounting the bracket 12 on the door 6 permits the safety belt 9 to function as a passive safety device. The bracket 12 may, however, be located on the automobile frame adjacent the door 6, if the belt is not to function as a passive safety device. The belt 9 also includes an emergency belt buckle 13 that is located on the belt for use only if the winding spool 11 becomes blocked or if after an accident, the vehicle door 6 cannot be opened. To the extent that it is necessary for an understanding of the operation of the safety belt 9 as a passive safety device, the specification and drawings of patent application Ser. No. 401,680, filed Sept. 28, 1973, are incorporated by reference herein.

While the diagonal shoulder belt 9 restrains the upper portion of the passenger's body in the event of an accident, an energy absorbing impact element 10 is mounted on the automobile frame underneath the dashboard 5 to restrain the lower portion of the passenger's body and to prevent the man from sliding under the belt 9. The impact element 10 is located generally in the zone of the man's knees 23 when he is seated in the seat 7 and sufficient space is left between the impact element 10 and the seat 7 to permit relatively unhindered entry into and exit from the automobile. The surface of the impact element 10 presented to the passenger's knees 23 is formed with two trough-like recesses 14 that each receive one of the passenger's knees. The side boundary walls 15 of the recesses 14 are inclined so that the recesses widen in a direction toward the man 8. Thus, the inclined walls 15 guide the man's knees 23, when impacting on the element 10, into the recesses 14. At the narrow ends of the recesses 14, the man's knees 23 will be restrained so that his thighs and femurs assume the generally parallel, favorable position for the transmission of impact loads to his pelvic region, as shown, for example, by the solid lines in FIG. 1. The relatively wide, open ends of the recesses 14 also provide space for the man 8 to move his knees 23 while seated in the automobile during normal conditions.

As shown in FIG. 2 of the application drawings, the impact element 10 includes a plate metal support 18 extending transversely of the vehicle and having a box-like or U-shaped cross-section. The surface of the support 18 presented to the passenger is covered with a cushioning layer 19 of hard foam rubber, for example, in order to prevent injuries due to sharp edges occurring on the support. The cushioning layer 19 is also configured to provide the two recesses 14 with a partition portion 16 between them. In the event of a collision and a consequent impact on the element 10, the support 18 will plastically deform in a predetermined manner so that its deformation dissipates a large portion of the impact energy and so that the restraining force acting through the man's knees and his femurs will not exceed prescribed admissible stress or load values.

To enhance the operation of the impact element 10, a guide member 17 is mounted on the door 6 of the automobile at a level corresponding to the vertical position of the thighs of the man 8, when seated in the seat 7. As best shown in FIG. 3, the guide member 17 is configured and located so that, when the door 6 is closed, the guide member essentially defines a continuation of one of the boundary walls 15 of a recess 14. The guide element 17 thus also insures that the man's right knee, at least, will be directed into its corresponding recess 14 in the event of an accident and not, for example, be jammed in the corner defined by the door 6 and the impact element 10 adjacent the door hinge.

Figure 4:
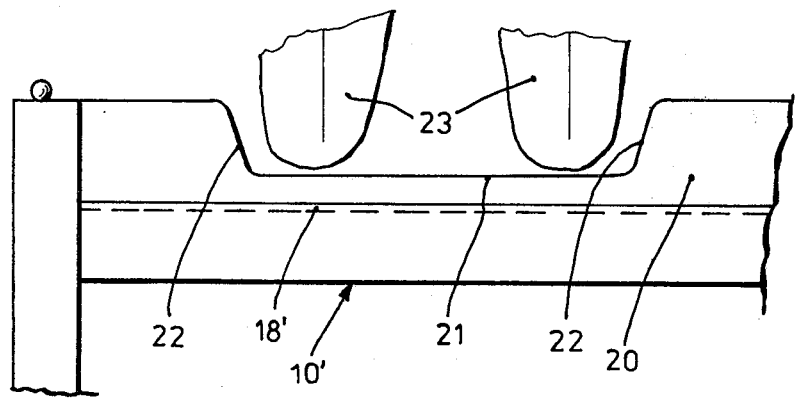
FIG. 4 is a plan view of an alternate embodiment of the impact element illustrated in FIGS. 2 and 3.

While the embodiment of FIGS. 2 and 3 provides two recesses 14, one for each of the man's knees 23, it is also possible to provide a single common recess for both knees, as shown in FIG. 4. In FIG. 4, the cushioning layer 20 on the plastically deformable metal support 18' is configured to form a single recess 21 with inclined boundary walls 22. While the single recess 21 affords somewhat greater freedom of movement under normal conditions for the passenger's legs, it is somewhat less effective in preventing injuries as compared to two separate recesses 14. Specifically, the partition 16 of FIG. 3 prevents the man's legs from crossing, while the single recess 21 of FIG. 4 cannot guarantee that such crossing of the legs will not occur. Nonetheless, the space between the man's knees 23 and the impact element 10' is sufficiently small that the man's legs are unlikely to move too close together.

Figure 5:
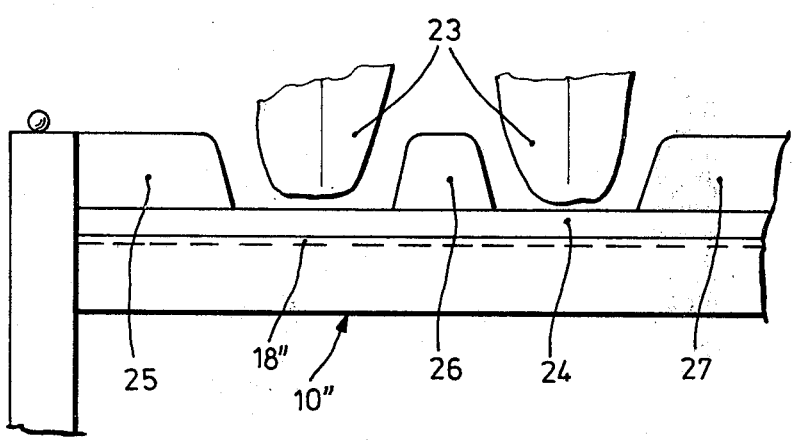
FIG. 5 is a plan view of another embodiment of the impact element illustrated in FIGS. 2 and 3.

Rather than having a one-piece cushioning layer 19 fabricated and bonded in place on a support 18, a plurality of cushioning bodies 24, 25, 26 and 27, as shown in FIG. 5, may be mounted on a plastically deformable support 18''. The cushioning bodies 24–27 are fabricated of hard foam rubber and are fastened to the support 18'' in any convenient manner. As shown, the cushioning body 24 extends across the entire width of the support 18'' and the bodies 25–27 are positioned on the body 24 at appropriately spaced apart locations to produce two recesses.

It will be understood that the embodiments of the invention described above are merely exemplary and that persons skilled in the art may make many variations and modifications without departing from the spirit and scope of the invention. All such modifications and variations are intended to be within the scope of the invention as defined in the appended claims.

We claim:

1. A safety device for a passenger in a vehicle comprising means for restraining an upper portion of the passenger's body relative to a vehicle seat and impact energy absorbing means disposed on the vehicle in a zone adjacent the knees of the passenger when seated in the vehicle seat and having a configured impact surface presented to the passenger's knees for guiding the knees of the passenger, when impacting on the energy absorbing means, into positions in which the passenger's thighs are aligned generally parallel to the longitudinal axis of the vehicle, wherein said configured impact surface includes a frontal impact portion and lateral guiding portions leading in toward the frontal impact portion, said frontal and lateral portions defining at least one recess adapted to receive the passenger's knees into aligned positions upon impact.

2. A safety device according to claim 1, wherein said at least one recess is widest adjacent the vehicle seat and gradually narrowing in a direction away from the seat.

3. A safety device for a passenger in a vehicle comprising means for restraining an upper portion of the passenger's body against a vehicle seat and means for absorbing energy on impact, the energy absorbing means being disposed on the vehicle in a zone adjacent the knees of the passenger when seated in the vehicle seat, the energy absorbing means having a surface presented to the passenger configured to guide the knees of the passenger, when impacting on the energy absorbing means, into positions in which the passenger's thighs are aligned generally parallel to the longitudinal axis of the vehicle, wherein the restraining means includes a shoulder safety belt adapted to extend diagonally across the upper portion of the passenger's body.

4. A safety device for a passenger in a vehicle comprising means for restraining an upper portion of the passenger's body against a vehicle seat and means for absorbing energy on impact, the energy absorbing means being disposed on the vehicle in a zone adjacent the knees of the passenger when seated in the vehicle seat, the energy absorbing means having a surface presented to the passenger configured to guide the knees of the passenger, when impacting on the energy absorbing means, into positions in which the passenger's thighs are aligned generally parallel to the longitudinal axis of the vehicle, wherein said surface of the energy absorbing means is configured to define at least one recess adapted to receive the passenger's knees, said at least one recess being widest adjacent the vehicle seat and gradually narrowing in a direction away from the seat, said safety device also comprising a guide member mounted on a door of the vehicle in a zone adjacent a thigh of the passenger, when the door is closed and the passenger is seated in the vehicle seat, the guide member being configured and located so that a surface of the guide member defines an extension of and is aligned with a portion of said surface of the energy absorbing means, said portion of said surface of the energy absorbing means defining an inclined side boundary of said at least one recess.

5. An energy absorbing impact element for protecting a passenger in a vehicle comprising a plastically deformable member mounted on the vehicle in a zone adjacent the knees of the passenger when seated in a vehicle seat associated with the deformable member, a surface of the impact element being presented to the passenger's knees and being configured to guide the passenger's knees, when impacting on the impact element, into positions in which the passenger's thighs are aligned generally parallel to the longitudinal axis of the vehicle, wherein said configured impact surface includes a frontal impact portion and lateral guiding portions leading in toward the frontal impact portion, said frontal and lateral portions defining at least one recess adapted to receive the passenger's knees into aligned positions upon impact.

6. An energy absorbing impact element according to claim 5, wherein said surface of the impact element is configured to define a separate recess for each knee of the passenger.

7. An energy absorbing impact element according to claim 5, also comprising a plurality of deformable bodies mounted on the plastically deformable member in spaced relation so as to define between them said at least one recess of the impact element.

8. An energy absorbing impact element according to claim 7, wherein the deformable bodies are fabricated of foam rubber.

9. An energy absorbing impact element for protecting a passenger in a vehicle comprising a plastically deformable member mounted on the vehicle in a zone adjacent the knees of the passenger when seated in a vehicle seat associated with the deformable member, a surface of the impact element being presented to the passenger's knees and being configured to guide the passenger's knees, when impacting on the impact element, into positions in which the passenger's thighs are aligned generally parallel to the longitudinal axis of the vehicle, wherein said surface of the impact element is configured to define at least one recess adapted to receive the passenger's knees, and wherein said at least one recess, measured in a direction transverse of the vehicle, widens in a direction toward the passenger when seated on the vehicle seat.

10. An energy absorbing impact element for protecting a passenger in a vehicle comprising a plastically deformable member mounted on the vehicle in a zone adjacent the knees of the passenger when seated in a vehicle seat associated with the deformable member, a surface of the impact element being presented to the passenger's knees and being configured to guide the passenger's knees, when impacting on the impact element, into positions in which the passenger's thighs are aligned generally parallel to the longitudinal axis of the vehicle, wherein said surface of the impact element is configured to define at least one recess adapted to receive the passenger's knees, and wherein said surface of the impact element is configured to define a single recess for both knees of the passenger.

11. A safety device for a passenger in a vehicle comprising:
   a. an energy absorbing impact element mounted on the vehicle in a zone adjacent the knees of the passenger when seated in a vehicle seat associated with the impact element; and
   b. a guide member mounted on a door of the vehicle at a height generally corresponding to the vertical location of the thighs of the passenger when seated in the vehicle seat,
   the impact element including a plastically deformable member and having a surface that is presented to the passenger's knees and that is configured to define at least one recess adapted to receive the passenger's knees and to guide the passenger's knees, when impacting on the element, into positions in which the passenger's thighs are aligned generally parallel to the longitudinal axis of the vehicle, the guide member being configured and located to guide the passenger's knees toward said at least one recess of the impact element.

12. A safety device according to claim 11, wherein a surface of the guide member, when the vehicle door is closed, defines an extension of and is aligned with a portion of the surface of the impact element, said portion of said surface of the impact element defining an inclined side boundary of said at least one recess.

* * * * *